(12) United States Patent
Schestopol et al.

(10) Patent No.: US 10,532,385 B2
(45) Date of Patent: Jan. 14, 2020

(54) DISPOSAL OF MEDICAMENTS

(71) Applicant: DisposeRx, Inc., Bethesda, MD (US)

(72) Inventors: Marcus Schestopol, Chevy Chase, MD (US); Donald Treacy, Woodbine, MD (US); Edward M. Rudnic, Potomac, MD (US); Beth A. Burnside, Kilmarnock, VA (US); John W. Holaday, Bethesda, MD (US)

(73) Assignee: DisposeRx, Inc., Bethesda, MD (US)

( * ) Notice: Subject to any disclaimer, the term of this patent is extended or adjusted under 35 U.S.C. 154(b) by 0 days.

(21) Appl. No.: 15/637,510

(22) Filed: Jun. 29, 2017

(65) Prior Publication Data

US 2018/0001357 A1 Jan. 4, 2018

Related U.S. Application Data

(60) Provisional application No. 62/356,361, filed on Jun. 29, 2016.

(51) Int. Cl.
*B09B 1/00* (2006.01)
*B09B 3/00* (2006.01)
(Continued)

(52) U.S. Cl.
CPC .............. *B09B 3/0033* (2013.01); *A61J 1/03* (2013.01); *B09B 3/0075* (2013.01); *B65D 65/46* (2013.01);
(Continued)

(58) Field of Classification Search
CPC ........................... B09B 3/0075; B09B 3/0033
See application file for complete search history.

(56) References Cited

U.S. PATENT DOCUMENTS 3,773,955 A 11/1973 Pachter et al.
3,966,940 A 6/1976 Pachter et al.
(Continued)

OTHER PUBLICATIONS

"Drug Buster—Drug Disposal As Safe and Easy As 1-2-3.", http://www.drug-buster.com, pp. 1-2, downloaded: Oct. 9, 2018.
(Continued)

*Primary Examiner* — Janine M Kreck
(74) *Attorney, Agent, or Firm* — Baker Botts L.L.P.

(57) ABSTRACT

Composition to aid in the sequestration and/or disposal of unused human or animal pharmaceutical drug or medication. The composition comprises a disposal composition material that contains a gelling or massing agent and optionally other components, and can be in the form of pellets, beads, beadlets, granules, or the like. The disposal composition material can be incorporated into a sachet or other disposal container or its cap to prevent the use of the medicament or the removal/extraction of active agent(s) from a pharmaceutical dosage form intended for disposal, to an appreciable extent and/or rate. With in the disposal agent, or fill material there may also be additional ingredients to promote mixing, sequestration or destruction of the active agent. The disposal composition is contained in a sachet and dispensed with a medicament for use when the patient has finished with the medication and there is material left over for disposal. In addition, the sachet could be made available for use with non-prescription drugs and other materials.

18 Claims, 3 Drawing Sheets

Disposal Composition Material Added to a Vial Before Disposal

Child-safety cap on a standard prescription vial

Disposefix sachet dispensed with the prescription

(51) Int. Cl.
*A61J 1/03* (2006.01)
*B65D 65/46* (2006.01)
*B65D 75/58* (2006.01)
*B65D 81/26* (2006.01)
*B65D 81/32* (2006.01)

(52) U.S. Cl.
CPC ....... *B65D 75/5805* (2013.01); *B65D 81/266* (2013.01); *B65D 81/32* (2013.01); *B09B 2220/14* (2013.01)

(56) References Cited

U.S. PATENT DOCUMENTS

| | | | |
|---|---|---|---|
| 5,144,016 A * | 9/1992 | Skjak-Braek | A61K 9/1652 |
| | | | 516/103 |
| 5,596,084 A * | 1/1997 | Sanderson | C08L 5/00 |
| | | | 536/3 |
| 5,965,651 A * | 10/1999 | Ishii | A61L 15/60 |
| | | | 524/104 |
| 6,696,088 B2 | 2/2004 | Oshlack et al. | |
| 7,332,182 B2 | 2/2008 | Sackler | |
| 7,771,707 B2 | 8/2010 | Hirsh et al. | |
| 7,867,511 B2 | 1/2011 | Anderson et al. | |
| 7,918,776 B2 | 4/2011 | Day | |
| 8,475,837 B2 | 7/2013 | Anderson et al. | |
| 8,535,711 B2 | 9/2013 | Anderson et al. | |
| 8,979,724 B2 | 3/2015 | Fowler et al. | |
| 9,035,121 B1 * | 5/2015 | Goodsell | B65F 1/002 |
| | | | 588/249.5 |
| 9,046,403 B2 * | 6/2015 | Ortenzi | A61J 1/03 |
| 2002/0150606 A1 | 10/2002 | Yamada et al. | |
| 2004/0033255 A1 * | 2/2004 | Baker | A61K 9/7023 |
| | | | 424/449 |
| 2009/0180936 A1 | 7/2009 | Anderson et al. | |
| 2012/0088951 A1 * | 4/2012 | Deryck | B09B 3/0033 |
| | | | 588/318 |
| 2014/0187842 A1 * | 7/2014 | Holaday | B09B 3/0075 |
| | | | 588/313 |
| 2017/0002098 A1 * | 1/2017 | Ayoub | B01J 39/19 |

OTHER PUBLICATIONS

"Element MDS (Medication Disposal System)—Case Study: Hospice of Southern Western Virginia", http://www.elementmds.com, pp. 1-3, downloaded: Oct. 9, 2018.

* cited by examiner

Disposal Composition Material in a Sachet
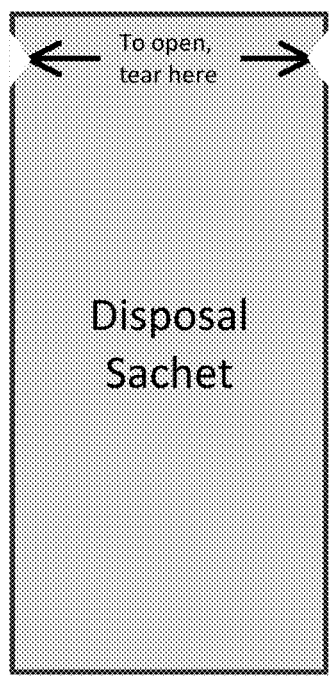
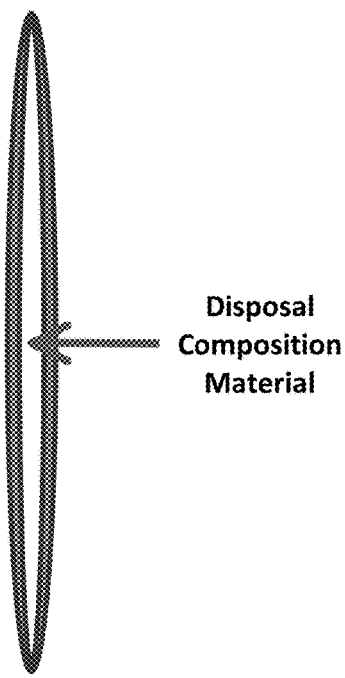
Disposal Sachet
(Front View)
FIG. 1A
Disposal Sachet
(Side View)
FIG. 1B Disposal Composition Material Added to a Vial Before Disposal

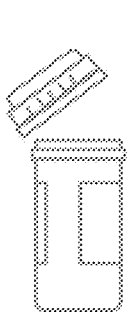

*Child-safety cap on a standard prescription vial*

FIG. 2A

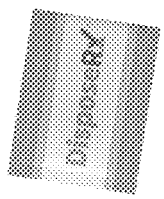

*DisposeRx sachet dispensed with the prescription*

FIG. 2B

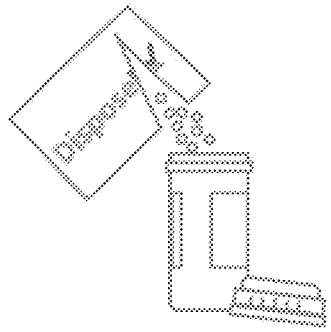

*Sachet is opened and contents are poured into the pill vial*

FIG. 2C

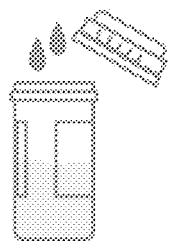

*The vial is partially filled with water and then shaken to dissolve/disperse drugs with the DisposeRx powder. Contents solidify in < 10 minutes*

FIG. 2D

DISPOSAL OF MEDICAMENTS

CROSS-REFERENCED TO RELATED APPLICATIONS

This patent application claims priority to U.S. Provisional Patent Application No. 62/356,361, filed Jun. 29, 2016, and entitled "Disposal of Medicaments." The entire disclosure of the above-identified priority application is hereby fully incorporated herein by reference.

FIELD OF THE INVENTION

The present invention relates to a composition for the sequestration and/or disposal of unused human or animal medicaments, which includes pharmaceutical products such as prescription drugs and over-the-counter (OTC) medications, as well as any other substance that can cause harm if ingested or damage the environment if disposed into wastewater. In certain aspects, the present invention is aimed at the deterrence of abuse or misuse of medicaments by a person other than the intended recipient, to remove and/or render unavailable the active agent(s) from medicaments that have a high rate of abuse, and/or to limit release of medicaments into the environment. The disposal composition may comprise a material, such as a powder, pellets, beads, beadlets, granules, package assemblies or the like, that are incorporated into a container, such as a sachet or other individual packet, for addition to existing containers or incorporated into the container or its cap that may accompany the medicament when issued to the patient. The disposal composition when used for the disposal of a medicament prevents the dosage form from being further used and/or prevents the active agent(s) from being removed for abuse or released into the environment to an appreciable extent and/or rate.

BACKGROUND OF THE INVENTION

Many medicaments, such as pharmaceutical drugs that are psychoactive or analgesic, have significant ability to cause euphoria or pleasurable effects, and are thereby at risk for abuse. In many instances such drugs are crushed, melted, dissolved or altered, and are then inhaled, snorted, injected or swallowed in a manner or dosage that is inconsistent with their intended or safe usage. Tampering of immediate release, or extended release formulations in particular, will rapidly deliver a bolus dose and produce a variety of serious and life threatening side effects, including respiratory depression and failure, sedation, cardiovascular collapse, coma, and death. Likewise, there are a number of medicaments that when administered at any level cause undesirable side effects, such as chemotherapeutics. Other medicaments, such as antibiotics, accumulate in the environment and may increase the evolution of antibiotic resistant organisms. It is important to dispose of such unused medication properly to prevent wrongful administration or contamination of wastewater treatment facilities.

Types of pharmaceutical drugs that are particularly targeted for tampering are those listed on Drug Enforcement Agency's Schedule II list, such as opioids, phenylephrine, stimulants like amphetamines and methylphenidate, benzodiazepines such as lorazepam (Alivan) and alprazolam (Xanax) and other types of drugs of abuse, which can be extracted from their dosage form in a variety of ways. For example, the dosage form can be mixed with a suitable solvent (e.g., water or alcohol), and then the drug can be filtered and/or extracted from the mixture for intravenous injection. Extended release dosage forms can be dissolved in water, alcohol or another "recreational solvent" to hasten the release of the drug, and then ingested orally; this provides high peak plasma concentrations of the drug and maximum euphoria effects. There is an enormous need to dispose of these drugs, especially opioids, safely since leftover opioids contribute to the steady increase of opioid abuse, overdoses and death in the past decade.[1]

Other pharmaceuticals such as highly potent drugs (e.g., alprazolam and chlorpromazine) and drugs with strong side effect profiles such as chemotherapeutics (e.g., including, but not limited to bendamustine, cisplatin, paclitaxel, topotecan, thalidomide, lenalidomide and related substances) may be dangerous if administered accidentally and are harmful to the environment if disposed into the sewer or landfills. Other categories of problematic medicaments include antibiotics (e.g. including, but not limited to penicillins, cephalosporins, aminoglycosides, and sulfonamides), where chronic exposure beyond the intended recipient can enter the food chain or waste disposal system to result in antibiotic resistance. Other general categories of problematic medicaments include cardiovascular drugs (e.g., including, but not limited to antihypertensives and statins) and erectile dysfunction drugs (e.g., including, but not limited to Viagra®, Cialis®, and Levitra®).

Once the patient is done using medication, which often constitutes taking only a portion of the amount provided, the medication is often disposed of unchanged in the household waste or flushed down the toilet. Alternatively, leftover and expired medications can remain in the family or household medicine cabinet, available for both unintended used and abuse. Both of these medication endpoints have serious unintended consequences. If the product is disposed in the household waste or flushed into the sewer system, it can pass unchanged into the environment where it will likely create toxic effects on animals and cause an imbalance in the local ecosystem. This disposal of medicaments into wastewater and landfills has poisonous effects and is gaining wide opposition.[2] In fact, the ramifications for the environment and human health with respect to drug disposal are currently under review by the U.S. Environmental Protection Agency (EPA), Office of Research and Development (ORD), National Exposure Research Laboratory (NERL), Environmental Sciences Division (ESD). The goal of the EPA and other organizations is to reduce the entry of active pharmaceutical agents into the environment, with the ultimate objective to minimize exposure (both chronic and acute) to humans and wildlife alike.[3]

A major safety campaign is currently underway in the United States to dispose of drugs at risk for abuse in a manner that will prevent their misuse, either by accidental administration or by illicit use. The United States Food and Drug Administration (FDA), the Drug Enforcement Agency (DEA), and White House Office of National Drug Control Policy (ONDCP) offer guidance for unused pharmaceutical product disposal, which includes directions to flush drugs down the toilet or to mix drugs with coffee grounds to throw away, and encouragement to participate in "take-back" programs. This guidance, however, is dependent on consumer compliance and teaches processes that maintain environmental exposure or may lead to diversion. Further, the risks of the improper disposal of pharmaceutical agents beyond those listed above include legal liabilities to pharmaceutical companies, health care facilities and pharmacies that are increasingly being held responsible for the dangers posed by drugs that remain in medicine cabinets and not properly disposed.

There are many examples of centralized collection or mail-in pharmaceutical disposal systems that use traditional large-scale industry approaches for the sequestration and disposal of pharmaceutical agents. To be successful, such systems require substantive compliance from the consumer and create risks to the collectors, such as law enforcement or pharmacies, as they do not have tight control of the disposed or returned pharmaceutical agents (including scheduled drugs) that they receive.

As a result, a significant amount of these unused pharmaceuticals accumulate in consumers' homes, are abused by persons removing them from medicine cabinets, are released into the environment through disposal into the water system as recommended by the FDA, are misused by persons other than those receiving the prescription, or are diverted to illegal trade channels.

Another approach is to dispose of unused pharmaceutical agents using a secondary containment distributed collection system. These systems involve emptying unused drugs into a pouch, bag or bottle that contains sequestering or aggregating agents, or emptying a second container with such agents into a first container and adding water.[4]

Psychoactive medicaments are of particular concern, as there are two major ways that unused psychoactive medicaments can cause harm. The first, described above, are the unsafe methods of disposing unused medicaments that can then be channeled to improper use or cause harm to the environment. The second is to attempt to extract the active ingredients of psychoactive medicaments for the purpose of abuse.

To prevent misuse of medicaments, especially drugs at risk for abuse, various technologies have been developed. One approach is to combine in the same pharmaceutical formulation the active agent and a second agent that is capable of limiting the psychotropic effect of the active agent when the formulation is taken parenterally. An example is a combination of methadone, an opioid agonist, and naloxone, an opioid antagonist, that if simultaneously administered, would result in minimal or no opioid effects by the abuser.[5]

Approaches have also been developed that target preventing the tampering of opioids. For example, one method is to inter-disperse an opioid and an antagonist in a pharmaceutical formulation, such that the antagonist is "sequestered" in a form that prevents it from being released when the medicinal product is taken by its normal oral route.[6] However, a concern regarding this approach is that the necessary chemical association of the two compounds can lead to a complex manufacturing process and high production costs. Also, leaching of the antagonist into the bloodstream can block the desired pain relieving therapeutic effect of the opioid.

Another approach is a dosage form in which the opioid is associated with an antagonist and an irritant that is sequestered in a closed compartment, such that tampering with the dosage form leads to release of the irritant.[7] Yet, preparation of this dosage form requires the association of three active agents and the creation of compartments, which makes its manufacture complex and more costly than a simple dosage form such as a tablet.

Another approach is to add a bad smelling agent to the opioid, such that attempts to inhale the active agent would be thwarted.

Other approaches do not involve an association of the opioid or active substance with an antagonist, but rather the dosage form is manufactured wherein the opioid forms a salt with one or more fatty acids, thereby increasing its lipophilicity and preventing its immediate release if the pharmaceutical form is tampered.[8] This type of dosage form requires chemical conversion of the active agent.

A general issue with the approaches named above is that the manufacturer must take the time to incorporate, test, and gain approval from the FDA to obtain claims that would enable the marketing of such abuse deterrent technologies, which can take 5-10 years or work to produce. There are numerous drugs on the market right now for which an abuse deterrent system is only partially effective or will never be incorporated into the products. These drugs will continue to harm people, and this issue is becoming a public health concern across the United States.

Another issue that applies to the approaches that are not abuse deterrent technology incorporated into the dosage form, i.e., as separate collection compositions, is that they are limited in the amount of drug they can absorb. For instance, activated charcoal in disposal compositions are often difficult to wet, which can lead to lack of mixing with the drug product and may prevent absorption of the intended drug substance. Moreover, the products can be inconvenient to obtain, because they must be ordered separately from the purchase of the prescription.

There is therefore a need for a convenient and widely distributed or easily obtainable disposal composition that allows for the safe disposal of medicaments that are expired or no longer needed by the patient to whom the product was intended or prescribed. The need to develop an effective disposal means of such products will become greater as the drugs become more commonly prescribed to treat ageing populations where cancer, pain and other conditions increasingly prevail. Over the last decade, fatal prescription drug poisonings (abuse and accidental) have increased 5-fold. In 2010, of the 38,329 drug overdose deaths reported by the Center for Disease Control (CDC), almost 60% or 22,000 deaths were related to prescription drugs. Over 70% of prescription drug abusers acquire their drugs from friends or relatives without permission (i.e., home medicine cabinets). Trends for teen prescription drug abuse continue to outpace any other drug use except marijuana.

The disposal of unwanted drugs within the current regulatory and legal framework is complex and ineffective. This is largely due to the restrictive handling of controlled substances and the conflicting recommendations from the Food and Drug Administration (FDA), the Drug Enforcement Administration (DEA), and the Environmental Protection Agency (EPA). As reviewed above, according to the FDA's website "How to dispose of unused medicines," leftover medications should be flushed down the toilet, thrown into the trash, or taken to drug "take back" programs in the community. These alternatives have the potential to harm the environment or result in diversion for illicit use, and "take back" programs offered by the DEA are an inconvenience and do not encourage compliance. In California and Washington, laws are now in place, which hold both the drug companies and pharmacies responsible for the leftover drugs in the patient's medicine cabinet.

Thus, an effective disposal composition for unused drugs of abuse such as opioids, psychoactive medicaments and other therapeutics is a critical unmet need to ensure safety for patients and the environment.

SUMMARY OF THE INVENTION

Various embodiments of the present invention relate to a composition for the sequestration and/or disposal of unused human or animal medicaments, such as prescribed or non-prescribed medications, as well as any substance that can be toxic if ingested or exposed in the environment. The disposal composition comprises a material that can render a medicament unusable according to the use instructions, unavailable for extraction for abuse, and/or ineffective in achieving its intended or unintended purpose. A further advantage of the composition is the sequestration of the active ingredients into a matrix from which it is not easily extracted or leached into groundwater upon disposal into the garbage/landfill.

In certain embodiments, the disposal device further comprises a disposal device container that is dispensed within the medicament container or separate from the medicament container. In some embodiments, the container is easy to open, such as a plastic cup with a removable foil lid, a plastic or cardboard bottle or box with a re-sealable lid, a re-sealable bag, etc. Examples of disposal device containers may include, but are not limited to, a sachet, packet, bottle, bottle cap, vial, membrane enclosures, and the like. In embodiments in which the disposal device container is a sachet, the sachet can be made of material that dissolves, or can be made of a material that requires the user to open the sachet and add it to the liquid in the container with the drug for inactivation by the composition.

In some embodiments, the disposal composition, and the disposal materials therein, are incorporated into the fabrication of the medicament container, such as in or along the internal bottom or side-wall surfaces or in the container lid or cap (e.g., a child resistant cap or a permanently locking cap).

The method of delivery includes packets that contain powdered, cross-linking polymers. These packets are opened, and the powder contents are added to the prescription vial that contains leftover/expired drugs. Water is then added to the vial, and the contents are shaken vigorously for 20-30 seconds. This starts the dispersion and dissolution of the drugs into the matrix which then rapidly solidifies into a biodegradable sequestering gel from which drugs cannot be extracted or leech into groundwater. The container is then thrown into the trash.

The present invention also describes the use of a packet, included within or accompanying the prescription vial, that contains the same cross linking polymers described above, however in this formulation they are contained in a surrounding membrane or paper that rapidly dissolves when water is added. By analogy, prescription vials containing certain medicaments are dispensed along with a desiccant packet that ensures that the contents are kept dry. These desiccant packets are manufactured by companies such as Desiccare® and Multisorb® (see below), and they contain silica in a small paper packet. Desiccant packets are usually included in prescription or over-the-counter drug formulations where exposure to moisture would damage their formulation or chemical ingredients.

In certain embodiments, the DisposeRx formulation specifically, and more generally, any formulation that is designed to capture pills in a solid, semi-solid or liquid matrix, be included within the prescription vial much as a desiccant packet. It is not implied or necessary that the DisposeRx packet only be included within prescription vials that contain desiccant packets, but in any prescription or over-the-counter drug container that contains pills, tablets, capsules, patches or other drug formulations for human or animal use. It is proposed that the DisposeRx packet be included by itself, along with desiccant packets or mixed with desiccants in one formulation containing both desiccants and the DisposeRx formulation as required.

Further embodiments of the invention relate to medicament containers that comprise a disposal composition container, and disposal composition material therein, incorporated into the fabrication of the medicament container, as described above.

It is further proposed that the DisposeRx packet contain sufficient powdered material that, when mixed with water, forms a solidifying gel or solid from which drugs cannot be readily extracted for abuse, accidental poisoning or leech into landfills and/or groundwater. Instead of adding a powder from an external source, the DisposeRx powder or other inactivating formulations are activated by the addition of water to the vial containing the drugs and packet. Water should be added in a sufficient amount to fill the vial and contents about half way or more, but not completely since space is required for the contents to mix when shaken.

The size of the DisposeRx internal packet should fit into the prescription or over-the-counter vial, and contain sufficient material to inactivate a variety of numbers of tablet/capsules ranging as a few to as many as several hundred drugs, depending on the required container size and the quantity of drugs to be disposed.

In another formulation, the DisposeRx powder can be added with the desiccant powder in a single packet containing a mixture of both powdered products. The desiccant powder, usually a silica formulation, would not interfere with the chemistry of the cross linking DisposeRx formulation.

The DisposeRx formulation is manufactured of components that are generally recognized as safe (GRAS); these substances that are often included in various foods and drugs, and are not toxic. The desiccant silica powder is also listed by the FDA as a GRAS ingredient (GRAS Notice (GRN) No. 298: http://www.fda.gov/Food/FoodIngredientsPackaging/GenerallyRecognizedasSafeGRAS/GRAS-Listings/default.htm).

Various embodiments of the invention relate to a method of sequestering and/or disposing of an unused medicament, comprising mixing the unused medicament with a disposal composition material and a solvent, such as a hydrophilic diluent. In some embodiments, the solvent is water, alcohol, vinegar, milk or bleach.

In some embodiments, the medicament is in an oral dosage form such as, but not limited to, a tablet, capsule, or other solid oral product. In certain embodiments, the disposal composition material and a solvent, such as water, are added to the medicament container that has any unused portion of the medicament. The disposal composition can be used once the patient has completed the course of therapy, regardless of whether completion constitutes using the entire medicament dispensed to the patient. In certain embodiments, once the contents are treated with the disposal composition, the medicament container can then be deposited into the household, industrial or other suitable waste container for disposal.

In some embodiments, the medicament is in the form of, but not limited to, an injectable, solution, suspension, or other liquid dosage form. In certain embodiments, any remaining solution can be added to the disposal composition container.

In some embodiments, the disposal composition material is in the form of a powder, pellet, bead, beadlet, granule, or the like, or a combination thereof. Each powder, pellet, bead, etc., may comprise one or more components that are both hydrophilic and hydrophobic, which may solidify, in part or fully, after some period of time and/or may slow extraction of the one or more active agents in the medicaments after the addition of the disposal composition material to the medicament and the addition of an aqueous or alcoholic solvents. In some embodiments, the material that is suitable for the disposal composition comprises including, but not limited to polyvinyl alcohol, carrageenans, chitosans, sodium alginate, or combinations thereof.

In further embodiments, the disposal composition material may be co-formulated or combined with other components, such as a cross-linking agent, solidification agent, a pH-modifier, or other component that affects the recovery of the pharmaceutical dosage form and/or components which produce an effervescent effect, thereby aiding in the disintegration and mixing process of the medicament; this is especially suitable for disposing of solid oral dosage forms that would benefit from additional continued agitation. In some embodiments, the other components may be co-formulated with the disposal composition material, for example, in the same powder, bead, etc., as the disposal composition material. In certain embodiments, the other components may be combined with the disposal composition material, for example, in separate powder, beads, etc., as the disposal composition material.

In some embodiments, the disposal composition material may comprise one or more agents that neutralize or diminish the therapeutic effect of the medicament. In certain embodiments, the agents may interact with the medicament to neutralize its intended effects. In other embodiments, the agents may provide their own therapeutic effect upon administration that neutralizes or antagonizes the therapeutic effect of the medicament. In some embodiments, the medicament comprises one or more opioids and the agents comprise opioid inverse agonists, opioid antagonists, or a combination thereof. In yet other embodiments, the disposal composition material may comprise an agent that when the disposal composition is activated, the resulting mass is either acidic or basic in nature to aid in the disposal of a variety of medicaments which may have either acid- or base-resistant properties.

In further embodiments where the disposal composition material is incorporated in the manufacture of the medicament container or container cap, the materials may be co-formulated or incorporated as separate reagents.

In certain embodiments, the disposal composition can be utilized with any substance that may be harmful or toxic to ingest or otherwise be administered. Preferably, the disposal composition can be utilized with one or more medicaments, which may include pharmaceutical products such as prescription drugs and OTC drugs, or alternative therapies. In some embodiments, the pharmaceutical products may be anti-infectives, antineoplastics, biological, cardiovascular agents, central nervous system agents, chemotherapeutics, coagulation modifiers, gastrointestinal agents, hormones, immunologic agents, metabolic agents, psychotherapeutic agents, respiratory agents, or topical agents. In certain embodiments, the OTC drugs may be, for example, aspirin, Advil®, or Tylenol®. In some embodiments, the alternative therapies may be vitamins, nutritional supplements, natural/plant derived products, yeast and other fermented supplements, or other naturally derived therapeutic agents.

In embodiments of the invention, the one or more medicaments may be abusable drugs such as Schedule I, II, or III, etc, drugs. These drugs include opiate and opiate derivatives, hallucinogenic or psychedelic substances, depressants, and stimulants.

In certain embodiments, the one or more medicaments may be household animal medicaments such as flea and tick treatments. These treatments are often left over after a pet is deceased, and are considered poisonous if ingested by small children.

In some embodiments, the one or more medicaments may be drugs that are past their expiration date.

In certain embodiments, the disposal composition can be utilized with one or more abusable drugs comprising morphine and oxycodone.

In certain embodiments the disposal composition can be used with multiple medicaments in need of disposal at the same time. This can include, but is not limited to, the medicament dispensed with the disposal composition and medicaments not dispensed with the disposal composition.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

For a more complete understanding of the invention, reference is made to the following description and accompanying drawings, as follows:

FIGS. 1A & 1B shows embodiments of the invention in which the disposal composition container is a sachet. FIG. 1A shows the front view of a sachet, or packet containing the disposal composition material. FIG. 1B shows a side view of a sachet, with an internal area holding the disposal composition material.

FIGS. 2A-D show embodiments of the invention in which the disposal composition container is a sachet, and the sachet is opened, and the disposal composition is poured into the prescription product container. FIG. 2A shows an oblique view of a prescription product container with a child-safety cap. FIG. 2B shows the sachet. FIG. 2C shows the opened sachet and the disposal composition material pouring into the opened vial containing unused pills. FIG. 2D shows the disposal composition material in the prescription product container while its cap is removed, and the addition of a solvent such as water. The cap is replaced, and the vial containing unused pills, capsules or transcutaneous patch is shaken with the disposal composition material and water (solvent) to dissolve the contents and activate the composition material. The contents rapidly solidify, and the container is then disposed in the trash.

DETAILED DESCRIPTION OF THE EXAMPLE EMBODIMENTS

Figure 3:
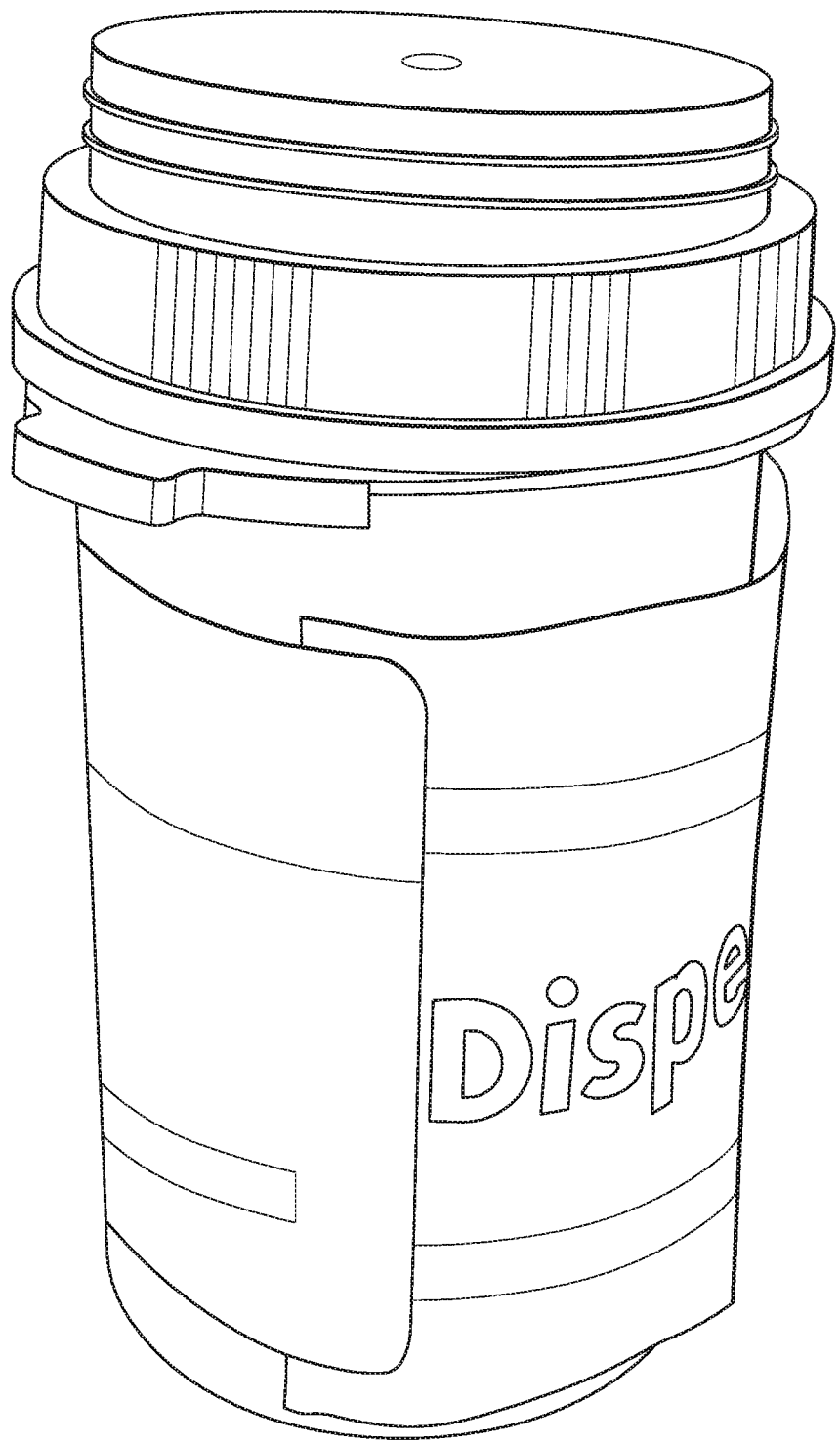
FIG. 3 shows the sachet attached with the prescription label on a standard vial.

The present invention can be understood more readily by reference to the following detailed description, examples, drawings, and claims, and their previous and following description. However, before the present compositions and methods are disclosed and described, it is to be understood that this invention is not limited to the specific compositions and methods disclosed unless otherwise specified, as such can, of course, vary. It is also to be understood that the terminology used herein is for the purpose of describing particular aspects only and is not intended to be limiting. The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

The present invention relates to a composition for the sequestration and/or disposal of unused human or animal medicaments, such as drugs or medications. The present invention also relates to a method of sequestering and/or disposing of unused medicament, comprising mixing the unused medicament with a disposal composition material and a solvent.

The composition enables the safe and proper disposal of unused medicaments to reduce misuse of drugs and medications, and/or to lower the amount and/or rate of active agents that can be extracted when the medicament is acquired by an individual for whom the product has not been prescribed or intended. By destroying the medicament and/or reducing the amount of the extractable active agent, those misusing the product may be prevented from experiencing the euphoric, pleasurable, reinforcing, rewarding, mood altering, and/or toxic effects of the active agent. And by reducing the extraction rate, those misusing the product may be deterred from continuing because of the length of time required for the extraction process.

Definitions

The term "disposal composition material" refers to a component of the disposal composition of the invention that can render a medicament unusable according to the use instructions and/or unavailable for extraction for abuse.

The term "disposal composition agent" refers to an agent that interacts with a solvent to gel, form a mass, increase viscosity, etc.

The term "disposal composition container" refers to a container in which the disposal device material can be dispersed and/or contained.

The term "medicament" refers to any product or therapy that contains one or more active agents. A medicament may be a prescription or non-prescription drug product, or it may be an alternative therapy (e.g., vitamin or nutritional supplement).

The term "medicament container" refers to the container or enclosure in which the medicament is provided (e.g., sold, transported, etc.).

The term "abusable drug" refers to any active agent that is known to have the potential for abuse. An example of an abusable drug is an opioid agonist.

The term "misuse" refers to the use of a medicament in a manner that is not consistent with the use information. "Misuse" includes administering the medicament at an undirected (e.g., unprescribed) dosage or frequency; in an undirected route of administration or combination with other treatments; or for an undirected purpose or duration. "Misuse" also includes administration after the medicament is expired, or accidental use.

The term "accidental use" refers to the use of a medicament without intent. Examples include administering the medicament while believing it was another product, or administering the medicament inadvertently (e.g., unintended exposure to an inhalant or puncture by a syringe), or ingesting the medicament without appreciating what it is (e.g., a child swallowing a pill believing it is candy).

The term "use information" refers to information that directs the use of the medicament, such as prescribing information or directions.

The term "tampered" or "tampering" refers to any manipulation by mechanical, thermal and/or chemical means that changes the physical properties of the dosage form, for example, to liberate the active agent for immediate release if it is in a sustained release formulation, or to make the active agent available for inappropriate use such as administration by an alternate route, for instance, parenterally. The tampering can be, for example, by means of crushing, shearing, grinding, mechanical extraction, solvent extraction, solvent immersion, combustion, heating or any combination thereof.

The term "abuse" in the context of, for example, "medicament abuse" or "drug abuse", refers to use, of the effects thereof: (i) in quantities or by methods and routes of administration that do not conform to standard medical practice; (ii) outside the scope of specific instructions for use provided by a qualified medical professional; (iii) outside the supervision of a qualified medical professional; (iv) outside the approved instructions on proper use provided by the medicament's legal manufacturer; (v) which is not in specifically approved dosage formulations for medical use; (vi) where there is an intense desire for and efforts to procure same; (vii) with evidence of compulsive use; (viii) through acquisition by manipulation of the medical system, including falsification of medical history, symptom intensity, disease severity, patient identity, doctor shopping, prescription forgeries; (ix) where there is impaired control over use; (x) despite harm; (xi) by procurement from non-medical sources; (xii) by others through sale or diversion by the individual into the non-medical supply chain; and (xiii) for medically unapproved or unintended mood altering purposes. Abuse can be in the context of intermittent use, recreational use and chronic use, including drug combinations.

The terms "abuse resistant," "abuse deterrent," and "deter abuse" may be used interchangeably and include formulations and methods that resist, deter, discourage, diminish, delay and/or frustrate (i) the intentional, unintentional or accidental physical manipulation or tampering of the dosage form (e.g., crushing, shearing, grinding, chewing, dissolving, melting, needle aspiration, inhalation, insufflation, extraction by mechanical, thermal and chemical means, and/or filtration); (ii) the intentional, unintentional or accidental use or misuse of the dosage form outside the scope of specific instructions for use provided by a qualified medical professional, outside the supervision of a qualified medical professional and outside the approved instructions on proper use provided by the medicament's legal manufacturer (e.g., intravenous use, intranasal use, inhalational use and oral ingestion to provide high peak concentrations); (iii) the intentional, unintentional or accidental conversion of an extended release dosage formulation of the invention into a more immediate release formulation; (iv) the intentional and iatrogenic increase in physical and psychic effects sought by recreational drug users, addicts, and patients with pain who have an addiction disorder; (v) the attempts at surreptitious administration of the dosage form to a third party (e.g., in a beverage); (vi) the attempts to procure the dosage form by manipulation of the medical system and from non-medical sources; (vii) the sale or diversion of the dosage form into the non-medical supply chain and for medically unapproved or unintended mood altering purposes; and (viii) the unintentional or accidental attempts at otherwise changing the physical, pharmaceutical, pharmacological and/or medical properties of the dosage form from what was intended by the manufacturer.

Disposal Composition

The disposal composition may comprise a disposal composition material that can render a medicament unusable according to the use instructions and/or unavailable for extraction for abuse and/or unavailable for leaching into water supplies or landfills. The disposal composition material, when combined with a solvent and the medicament, may form a gel or mass, i.e., a substance of high viscosity so that it is not easily pourable, transferable, or mixable, and generally remains in the container in which it is formed, such that the medicament is no longer useable for administration as directed in the use information, cannot be misused or accidentally used, or subject to abuse. As a result, the gel/mass will deter use of the medicament by an individual for whom the medicament was not intended, such as prevent an abuser from modifying the product to be used in a manner that is not consistent with the prescribing information or instructions for use.

The disposal composition may comprise a disposal device container that houses the disposal composition material. The disposal device container may serve different roles in the use of the disposal device. For example, the disposal device container may serve to house the disposal composition material, such that, during implementation, the material may be removed, in full or in part, from the disposal composition container to be added, perhaps along with a solvent, to the medicament container or to a separate container; or, during implementation, the unused medicament may be added, perhaps along with a solvent, to the disposal composition container. Alternatively, the disposal composition container may serve to introduce the disposal composition material to the unused medicament, such that, during implementation, the disposal composition container is added to the medicament container or to a separate container in which the unused medicament is placed; the disposal composition and medicament may then dissolve, such as upon addition of a solvent, to expose the disposal device material to the unused medicament. Or, the disposal composition container may be used to separate the disposal composition material from the unused medicament until implementation of the disposal device; for instance, the disposal composition container may be a membrane that separates the material from the medicament, and, during implementation, a solvent may be added to dissolve or breach the membrane to thereby expose the medicament to the material. One further application is to place the disposal composition container in the medicament container's lid or cap so that it can be dispensed into the medicament container.

Once the disposal composition is implemented and the gel/mass is formed of the medicament, subjecting the gel/mass to tampering, such as by crushing the gel/mass and/or and using aqueous or alcoholic solvents to extract the active agent for filtering and/or vaporizing the medicament for inhalation, may result in a gel/mass material that is not filterable or that has a filter rate that is diminished to an appreciable extent or that is prevented from being vaporized. In certain embodiments, the mechanism of action of the disposal composition material may involve intermolecular interactions of the disposal composition material with the active agent of the medicament, thereby preventing the active agent from passing through the filtration system or being vaporized.

Disposal Composition Material

The disposal composition material may have a polymer with reactive functional groups and a chemical cross-linker, such that the material forms a mass after mixing with water over a suitable period of time. This mass would then deter, slow, or even prevent, to an appreciable degree the extraction of the active agent by aqueous or alcoholic means or vaporization.

The disposal composition material may comprise one or more disposal composition agents (active agents), which may include one or more gelling or massing or sequestering agents. An example of a massing agent is sodium borate, which can also neutralize the drug through its pH and chemical action.

General examples of disposal composition agents are provided in Table 1:

TABLE 1

Disposal composition agents according to the present invention.

| Disposal composition agent | Function |
|---|---|
| Sequestering Polymer(s) | Encapsulating and immobilizing the drug(s) to limit physical and functional access to drug |
| Cross-linking agent | Chemically (ionic or covalently) link or bind the polymer(s) into a viscous gel network |
| pH Modifier | Adjust pH to optimize conditions for cross-linking |
| Active pharmaceutical agent | Blocks or inhibits the pharmacological action of the drug(s) to be disposed |

TABLE 2

Examples of disposal composition Sequestering Polymers according to the present invention.

| Disposal Composition Sequestering Polymer(s) | Viscosity (CPs)* |
|---|---|
| Polyvinyl Alcohol | 400-350,000 |
| Carageenan(s) | 500-450,000 |
| Alginate(s) | 200-400,000 |
| Chitosan(s) | 100-350,000 |

*The viscosity numbers given are general numbers and are affected by different characteristics of the materials, most importantly the molecular weights of the polymers. The concentration of the polymer in water can be adjusted to increase viscosity.

Potential gelling or massing agents can also, but are not required, to perform one or more of the following actions:
  destroy or dissolve a capsule or tablet;
  reduce the waste disposal costs by expanding in volume by less than 1%;
  will not release trapped contaminants if solute evaporation occurs;
  have a strong ion exchange capability allowing for binding;
  will not release free liquids when subject to freeze-thaw cycles;
  will not allow for vaporization of medicaments.

In additional embodiments, a disposal composition agent may interact with the medicament by neutralizing or otherwise diminishing its therapeutic effect. For instance, a disposal composition agent may be an acid or base that can degrade the medicament through contact. Examples include, but are not limited to, hydrochloric acid, boric acid, adipic acid, ammonium hydroxide, acetic acid, citric acid, lactic acid, ammonium carbonate, sodium bicarbonate, sodium bisulfate, sodium carbonate, sodium hydroxide, trolamine, potassium hydroxide, magnesium hydroxide, glutamate buffer, or phosphate buffer.

Polyvinyl Alcohol (PVA)

The viscosity of most PVAs are measured using a 4% solution (according to the pharmacopoeias). The molecular weight ranges (g/mol) for PVA can be between 31,000 and 145,000 and the degree of hydrolysis can be between 88 and 99%. The higher the hydrolysis grade of PVA, the higher the average molar mass, the better the thickening effect, the higher the sequestering effect on drug. The higher the viscosity, the higher the tensile strength of the hydrogel, the stronger the gel scaffold (# H-bonds), the higher the sequestering effect on drug.

Carrageenan

Carrageenan is a naturally-occurring family of carbohydrates. Kappa carrageenan is soluble in hot water. The addition of potassium and calcium cross-linkers induces the formation of a durable, brittle gel; it also increases the gelling and melting temperatures.

Iota carrageenan exhibit thixotropic characteristics and are soluble in hot water. The addition of calcium and potassium cross-linkers will induce the formation of a durable, elastic gel, and increase gelling and melting temperatures. Limited aggregation contributes to elasticity, no syneresis, is freeze/thaw stable and insoluble in most organic solvents.

Alginates

Alginate, or an alginate-containing mix, is gelled by a calcium cross-linker. Calcium ions diffuse into the mix containing alginate forming a calcium alginate gel when the calcium ions react with the alginate. Alternatively, a slowly soluble calcium salt and a suitable calcium sequestrant, such as a phosphate or citrate can be employed. The sequestrant is needed to bind free calcium and prevent pre-gelation of the alginate during the time the product is mixed. The shorter the mixing time, the lower the level of sequestrant needed. The gellation process may be performed at neutral or acid pH. The acidity may be obtained by the addition of an acidifier, which will accelerate the solubility of calcium salts. In some embodiments, the disposal composition material may contain colorants and/or opacifying agents.

In some embodiments, the disposal composition agents may provide their own therapeutic effect upon administration that neutralizes or antagonizes the therapeutic effect of the medicament. For example, the disposal composition agent may block or inhibit or override the therapeutic action of the medicament.

In certain embodiments, for cases when the medicament comprises an opioid, a disposal composition agent may be one or more opioid inverse agonists. The opioid inverse agonist may be non-selective such as, but not limited to, naloxone. Naloxone is often used to counter the effects of opiate overdose, for example heroin or morphine overdose. Naloxone is particularly used to counteract life-threatening depression of the central nervous system and respiratory system. In general, naloxone may be present in the disposal composition material in amounts ranging from about 1 mg to about 50 mg. Other materials may be present in other amounts as necessary to be effective.

The opioid inverse agonist may be selective, for example, having a high affinity for particular opioid receptors, such as a μ-opioid receptor, a-opioid receptor, K-opioid receptor, or o-opioid receptor.

In other embodiments, a disposal composition agent may be one or more opioid antagonists. The opioid antagonist may be non-selective such as, but not limited to, naltrexone, which is often used to help patients overcome opioid addiction by blocking the opioids' euphoric effects. Alternatively, the opioid antagonist may selective such as, but not limited to cyprodime, which is a selective μ-opioid receptor antagonist; naltrindole, which is a selective o-opioid receptor antagonist; and norbinaltorphimine, which is a selective K-opioid receptor antagonist.

In certain embodiments, the disposal composition agent may comprise a combination of non-selective or selective opioid inverse agonists or antagonists.

Disposal Container

Ideally, the disposal container is the same container or vial that the medicament was dispensed with, to the patient. Additionally, the disposal container may comprise a disposal device that houses the disposal composition material. The disposal container may be separate from the medicament container or may be incorporated into the medicament container, such as within, or attached to, the medicament container walls, bottom, and/or lid.

The disposal container can be in the form of a sachet, packet, straw, membrane enclosure, or other suitable container from which to house the disposal material. The disposal container can optionally be made as a re-sealable unit. The disposal container can also be in the form of a blister pouch or multiple pouches fused to the internal surface of the medicament container or the container's cap or lid. The disposal container may be a suitable container into which disposal composition material can be transferred to for the purposes of mixing the unused medicament with the disposal composition material. The disposal composition container can optionally be made as a re-sealable unit, such as a "zip-lock" bag.

The sachet, packet, straw or other suitable container can be square, round, rectangular or other suitable shape for either fitting into a medicament container. The blister pouch or pouches may be polygon, ovoid, serpentine, other suitable shape, or combination of various shapes. The shape of the blister pouch or pouches may be incidental or may confer functionality in the release of the disposal composition material.

The size of the disposal composition container, system and its contents can be scaled to accommodate a 30-, 60- or 90-day supply of the medicament contemplated for disposal. Typical sizes of pharmacy dispensing bottles can range from 30 ml to 100 ml. The disposal composition, including the container, can be scaled according to the pharmacy container size in anticipation of the volume of water to be added to the bottle. Thus, for a smaller quantity of medicament dispensed, a smaller unit of the disposal composition may be dispensed; with a larger quantity of the medicament dispensed, a larger unit, or multiple units of the disposal composition may be dispensed.

The disposal composition container in the form of blister pouch or pouches fused with the medicament container may be positioned within the medicament container or container cap so as to accommodate various fill levels of the medicament container.

The pharmacist may dispense the medicament, then depending on the size of medicament container, the pharmacist can then select 1×, 2×, 3× of the disposal composition to be co-dispensed. Alternatively, the pharmacist may select the medicament container fabricated with the disposal composition container that accommodates the fill level of dispensed medicament.

The disposal composition container can be manufactured by methods known to those skilled in the art, and be made from standard paper, plastic, polymers, etc. or specialty materials that confer functionality.

The disposal composition container can be made of material that dissolves upon contact with water or other solvent, thereby releasing the contents of the disposal composition container into the medicament container or a separate container of unused medicament. Examples of materials used for the disposal composition container are gelatin, ethyl cellulose, and other materials that are soluble on contact with water or partially hydrophilic solutions. In the case of blister pouches fused with the medicament container, multiple pouches may be made of various materials to affect a sequence of disposal composition materials.

Alternatively, the disposal composition container suitable for adding unused medicament to it can be made of plastic, waxed board like a milk carton, or other suitable container capable of holding both liquid and solid materials.

Method of Sequestering and/or Disposing of Unused Prescription Product

The present invention relates to a method of sequestering and/or disposing of unused medicament, comprising mixing the unused medicament with a disposal composition material and a solvent, such as a hydrophilic diluent. In some embodiments, the solvent is a fruit or vegetable juice, juice cocktail, water, milk, alcohol, distilled spirits, vinegar or bleach. In certain embodiments, the unused medicament and the disposal composition material as well as the solvent if a solvent is added, may be mixed, such as by an instrument or mixing composition known in the art, or by shaking or swirling the contents of the medicament container or the separate container.

In embodiments of the invention, the disposal composition material may be housed in the disposal composition container and, during implementation, the disposal composition material is removed from the disposal composition container and is added to the medicament container or lid or to a separate container. The solvent may also be added to the medicament container or the separate container. In some embodiments, the unused medicament and disposal composition material, and the solvent if a solvent is added, may be mixed.

In certain embodiments, the disposal composition material may be housed in the disposal composition container and, during implementation, the unused medicament may be added to the disposal composition container. The solvent may also be added to the disposal composition container. In some embodiments, the unused medicament and disposal composition material, and the solvent if a solvent is added, may be mixed.

In embodiments of the invention, the disposal composition material may be housed in the disposal device container and, during implementation, and the disposal composition container may be added to the medicament container or to a separate container that has the unused medicament. The solvent may also be added to the medicament container or the separate container. In some embodiments, the unused medicament and disposal composition material, and the solvent if a solvent is added, may be mixed.

As an example, FIGS. 2A-D depicts embodiments in which the disposal composition container is a sachet, and the sachet contents are poured into the medicament container. A solvent such as water can then be added to the medicament container to mix with the sachet and any unused medicament in the medicament container. The medicament container may be covered with a lid or cap and then mixed.

In further embodiments, the disposal composition container may be a part of the medicament container. For example, the disposal composition container may be attached to the inside of the medicament container, such as on the bottom, the side walls, or the lid of the medicament container. Or, the disposal composition container may be incorporated or embedded into the bottom, the side walls, or the lid of the medicament container; in this case, the disposal composition container may be in the form of: for instance, a blister or rib, and may comprise a membrane that prevents the disposal composition material from contacting the medicament unless it is breached or dissolved in full or in part.

For an oral dosage form such as, but not limited to, a tablet, capsule, or other solid oral product, once the patient has completed the course of therapy, whether that constitutes using the entire medicament dispensed to the patient or not, the disposal composition material may be added to the medicament container having any unused portion of the medicament, along with the solvent. The medicament container can then be deposited in the household, industrial or other suitable waste container for disposal. Alternatively, the unused medicament can be added to the disposal device container, along with the solvent. In other embodiments, the disposal composition material, the solvent, and the unused medicament may be mixed in a separate container that is neither the disposal device container nor the medicament container.

If the medicament is in the form of an injectable, solution, suspension, or other liquid dosage form, any remaining solution (for an injectable, the remaining solution would have to be removed from its medicament container, e.g., vial) may be added to the disposal composition container. A solvent may be added, if necessary.

Those who use medicaments in the form of a patch are often directed to flush the patch down the toilet for disposal. As an alternative, the patch can be placed in a vessel (e.g., jar, vial, etc.) with the disposal composition material, or placed in a vessel with the disposal composition container having the disposal composition material. The vessel can then be filled with water. This is especially useful for water soluble active containing products. Inhalants may similarly be disposed of using the disposal composition.

For instances when the medicament is an injectable, the injectable can be added to the disposal device container in addition to water or other solvents such as a fruit or vegetable juice, juice cocktail, water, milk, alcohol, distilled spirits, vinegar or bleach.

A further advantage of the composition is the sequestration of the active ingredients into a matrix from which it is not easily extracted or leached into groundwater upon disposal into the garbage/landfill. The disposal container is the same container or vial that the medicament was dispensed with, to the patient. In some embodiments, the material that is suitable for the disposal composition comprises including, but not limited to polyvinyl alcohol, carrageenans, chitosans, sodium alginate, or combinations thereof. In some embodiments, the disposal composition agents may provide their own therapeutic effect upon administration that neutralizes or antagonizes the therapeutic effect of the medicament.

The disposal composition can be utilized with any substance that may be harmful or toxic to ingest or otherwise be administered. For instance, the disposal composition may be utilized with one or more medicaments, including pharmaceutical products such as prescription drugs and OTC drugs, or alternative therapies. Pharmaceutical products that may be used with the disposal composition may include, but are not limited to, anti-infectives, such as ambecides, aminoglycosides, anthelimintics, antifungals, antimalarial agents, antituberculosis agents, antiviral agents, cephalosporins, penicillins, quinolones, sulfonamides, and tetracyclines; antineoplastics, such as alkylating agents, antimetabolites, monoclonal antibodies, thalidomide and analogs, and VEGFN EG FR inhibitors; biologicals, such as antitoxins, antivenins, and recombinant human erythropoietins; cardiovascular agents, such as agents for hypertensive emergencies or pulmonary hypertension, antiadrenergic agents, antiarrhythmic agents, calcium channel blocking agents, catechcholamines, diuretics, vasodilators, or vasopressors; central nervous system agents, such as analgesics, anticonvulsants, anxiolyticssedatives, hypnotics, cholinergic agonists, or muscle relaxants; chelating agents; coagulation modifiers, such as anticoagulants, antiplatelet agents, heparin antagonists, or platelet-stimulating agents; gastrointestinal agents, such as antacids, digestive enzymes, functional bowel disorder agents, gallstone solubilizing agents, GI stimulants, laxatives, or proton pump inhibitors; genitourinary tract agents, such as impotence agents, tocolytic agents, urinary pH modifiers, or uterotonic agents; hormones, such as 5-alpha-reductase inhibitors, adrenal cortical steroids, antiandrogens, antidiuretic hormones, aromatase inhibitors, calcitonin, estrogen receptor antagonists, gonadotropin-releasing hormone antagonists, progesterone receptor modifiers, sex hormones, or thyroid drugs; immunologic agents, such as immunostimulants or immunosuppressive agents; metabolic agents, such as antidiabetic agents, antigout agents, antihyperlipidemic agents, bone resorption inhibitors, glucose elevating agents, or lysosomal enzymes; psychotherapetutic agents, such as antidepressants or antipsychotics; respiratory agents, such as antihistimines, bronchodilators, decongestants, expectorants, or respiratory inhalant products; smoking cessation agents; or topical agents, such as antiseptics, dermatological agents, germicides, nasal preparations, ophthalmic preparations, or vaginal preparations. In certain embodiments, the OTC drugs may be, for example, aspirin, Advil®, or Tylenol®. In some embodiments, the alternative therapies may be vitamins, nutritional supplements, natural/plant derived products, yeast and other fermented supplements, or other naturally derived therapeutic agents.

The disposal composition can be utilized with one or more medicaments comprising abusable drugs such as schedule I, II, or III drugs. These drugs include opiate and opiate derivatives, hallucinogenic or psychedelic substances, depressants, and stimulants. Examples of abusable drugs include, but are not limited to, alfentanil, allylprodine, alphaprodine, anileridine, benzylmorphine, bezitramide, buprenorphine, butorphanol, clonitazene, codeine, cyclazocine, desomorphine, dextromoramide, dezocine, diampromide, dihydrocodeine, dihydroetorphine, dihydromorphine, dimenoxadol, dimepheptanol, dimethylthiambutene, dioxaphetyl butyrate, dipipanone, eptazocine, ethoheptazine, ethylmethylthiambutene, ethylmorphine, etonitazene, etorphine, fentanyl, heroin, hydrocodone, hydromorphone, hydroxypethidine, isomethadone, ketobemidone, levallorphan, levorphanol, levophenacylmorphan, lofentanil, meperidine, meptazinol, metazocine, methadone, metopon, morphine, myrophine, nalbuphine, narceine, nicomorphine, norlevorphanol, normethadone, nalorphine, normorphine, norpipanone, opium, oxycodone, oxymorphone, papaveretum, pentazocine, phenadoxone, phenomorphan, phenazocine, phenoperidine, piminodine, piritramide, propheptazine, promedol, properidine, propiram, propoxyphene, sufentanil, tramadol, tilidine, pharmaceutically acceptable salts thereof, prodrugs thereof, or combinations thereof.

The medicament may be water soluble drugs such as alfentanil, allylprodine, butorphanol, codeine, hydrocodone, hydromorphone, methadone, morphine, oxycodone, oxymorphone, pentazocine, tramadol and pharmaceutically acceptable salts thereof, prodrugs thereof, or combinations thereof. Other water soluble drugs include treatments for seizures, depression, fibromyalgia, migraine headaches and neuropathic pain such as gabapentin and analogs.

The medicament may also be highly potent drugs (such as morphine, alprazolam, and chlorpromazine) or drugs with strong side effect profiles such as chemotherapeutics (e.g., bendamustine, cisplatin, paclitaxel, and topotecan).

Examples of household animal medicaments that may benefit from a disposal composition are flea and tick treatments. These treatments are often left over after a pet is deceased, and are considered poisonous if ingested by small children. The medicaments may be drugs that are past their expiration date.

The invention will now be further described by way of the following non-limiting examples, which further illustrate the invention; such examples are not intended, nor should they be interpreted, to limit the scope of the invention.

| | Examples | |
|---|---|---|
| 1. | Gelcarin GP-812 | 1.5% |
| | Calcium carbonate | 1.5% |
| | Water | q.s. |
| | | 100% |
| 2. | Gelcarin GP-812 | 1.5% |
| | Potassium gluconate | 1.5% |
| | Water | q.s. |
| | | 100% |
| 3. | Gelcarin GP-379 | 1.5% |
| | Calcium carbonate | 1.5% |
| | Water | q.s. |
| | | 100% |
| 4. | Gelcarin GP-379 | 1.5% |
| | Potassium gluconate | 1.5% |
| | Water | q.s. |
| | | 100% |
| 5. | Protanal CR 8133 | 1.5% |
| | Calcium carbonate | 0.75% |
| | Citric Acid | 0.75% |
| | Water | q.s. |
| | | 100% |
| 6. | Protanal CR 8233 | 1.5% |
| | Calcium carbonate | 0.75% |
| | Citric Acid | 0.75% |
| | Water | q.s. |
| | | 100% |
| 7. | Manucol LKX | 1.5% |
| | Calcium carbonate | 0.75% |
| | Citric Acid | 0.75% |
| | Water | q.s. |
| | | 100% |
| 8. | PVA 26-88 | 5.0% |
| | Sodium Borate | 5.0% |
| | Water | q.s. |
| | | 100% |
| 9. | PVA 26-88 | 10.0% |
| | Sodium Borate | 10.0% |
| | Water | q.s. |
| | | 100% |
| 10. | PVA 40-88 | 5.0% |
| | Sodium Borate | 5.0% |
| | Water | q.s. |
| | | 100% |

| Examples | | |
|---|---|---|
| 11. | PVA 40-88 | 10.0% |
| | Sodium Borate | 10.0% |
| | Water | q.s. |
| | | 100% |
| 12. | PVA 28-99 | 5.0% |
| | Sodium Borate | 5.0% |
| | Water | q.s. |
| | | 100% |
| 13. | PVA 28-99 | 10.0% |
| | Sodium Borate | 10.0% |
| | Water | q.s. |
| | | 100% |
| 14. | PVA 26-88 | 5.0% |
| | Boric Acid | 5.0% |
| | Water | q.s. |
| | | 100% |
| 15. | PVA 26-8 | 10.0% |
| | Adipic acid | 10.0% |
| | Water | q.s. |
| | | 100% |
| 16. | Chitosan Low MW | 20.0% |
| | Calcium chloride | 10.0% |
| | Water | q.s. |
| | | 100% |
| 17. | Chitosan Medium MW | 15.0% |
| | Calcium chloride | 7.5% |
| | Water | q.s. |
| | | 100% |
| 18. | Chitosan Medium MW | 20.0% |
| | Calcium chloride | 10.0% |
| | Water | q.s. |
| | | 100% |
| 19. | Chitosan High MW | 10.0% |
| | Calcium chloride | 5.0% |
| | Water | q.s. |
| | | 100% |
| 20. | Chitosan High MW | 15.0% |
| | Calcium chloride | 7.5% |
| | Water | q.s. |
| | | 100% |

Screening Disposal Composition Agents

Pharmaceutical excipients were screened for their ability to increase the viscosity of aqueous solutions and their potential use in disposal composition material. Table 3 lists samples of disposal composition agents tested with or without additional excipients, and qualitative results of these agents on solutionviscosity.

The screening was performed using an extraction/filtration test. Briefly, 0.5 grams of powder were transferred into a container and 10 ml of water (tapped water at a temperature between 26 and 28° C.) was added. The mixtures were vigorously shaken until they were homogeneous, aided by a spatula when necessary to complete homogenization. The resulting suspensions were immediately filtered through a standard coffee filter (GK Connaisseur). Viscosity increase was evaluated by visual inspection, while filtration rate was evaluated by comparing the amount of liquid added to the filter to the amount of liquid recovered in the filtrate after 10 minutes of filtration. In all of the examples listed in Table 3, no filtrate could be obtained, and thus drugs could not be recovered by extraction using filtration. Accordingly, an abuser would have to overcome a significant hurdle to extract the drug from the activated disposal composition.

TABLE 3

Disposal Composition Cross Linking Agents/Excipients Screening Study:

| Example Number | Disposal Composition Agent(s) | Con. % (W/W) | Other Agents or Excipients | Initial (5 mins) Appearance | Filtration after 10 minutes |
|---|---|---|---|---|---|
| | Carageenans (Grade) | | | | |
| 1 | Gelcarin GP-812 | 1.5 | Calcium carbonate (1.5%) | Stiff gel - no flow | Unfilterable |
| 2 | Gelcarin GP-812 | 1.5 | Potassium gluconate (1.5%) | Stiff gel - no flow | Unfilterable |
| 3 | Gelcarin GP-379 | 1.5 | Calcium carbonate (1.5%) | Stiff gel - no flow | Unfilterable |
| 4 | Gelcarin GP-379 | 1.5 | Potassium gluconate (1.5%) | Stiff gel - no flow | Unfilterable |
| | Alginates (Grade) | | | | |
| 5 | Protanal CR 8133 | 1.5 | Calcium carbonate (0.75%); Citric Acid (0.75%) | Effervescent gel - Slow flow | Unfilterable |
| 6 | Protanal CR 8233 | 1.5 | Calcium carbonate (0.75%); Citric Acid (0.75%) | Effervescent gel - Slow flow | Unfilterable |
| 7 | Manucol LKX | 1.5 | Calcium carbonate (0.75%); Citric Acid (0.75%) | Stiff effervescent gel - No flow | Unfilterable |
| | Polyvinyl Alcohols (Grade) | | | | |
| 8 | PVA 26-88 | 5.0 | Sodium borate (5%) | Spongy stiff gel - No flow | Unfilterable |

TABLE 3-continued

Disposal Composition Cross Linking Agents/Excipients Screening Study:

| Example Number | Disposal Composition Agent(s) | Con. % (W/W) | Other Agents or Excipients | Initial (5 mins) Appearance | Filtration after 10 minutes |
|---|---|---|---|---|---|
| 9 | PVA 26-88 | 10.0 | Sodium borate (10%) | Spongy stiff gel - No flow | Unfilterable |
| 10 | PVA 40-88 | 5.0 | Sodium borate (5%) | Spongy stiff gel - No flow | Unfilterable |
| 11 | PVA 40-88 | 10.0 | Sodium borate (10%) | Spongy stiff gel - No flow | Unfilterable |
| 12 | PVA 28-99 | 5.0 | Sodium borate (5%) | Spongy stiff gel - No flow | Unfilterable |
| 13 | PVA 28-99 | 10.0 | Sodium borate (10%) | Spongy stiff gel - No flow | Unfilterable |
| 14 | PVA 26-88 | 5.0 | Boric Acid (5%) | Spongy stiff gel - No flow | Unfilterable |
| 15 | PVA 26-88 | 10.0 | Adipic Acid (5%) | Spongy stiff gel - No flow | Unfilterable |
|  | Chitosans (Grade) |  |  |  |  |
| 16 | Chitosan Low MW | 20.0 | Calcium chloride (10%) | Stiff gel - no flow | Unfilterable |
| 17 | Chitosan Medium MW | 15.0 | Calcium chloride (7.5%) | Stiff gel - no flow | Unfilterable |
| 18 | Chitosan Medium MW | 20.0 | Calcium chloride (10%) | Stiff gel - no flow | Unfilterable |
| 19 | Chitosan High MW | 10.0 | Calcium chloride (5%) | Stiff gel - no flow | Unfilterable |
| 20 | Chitosan High MW | 15.0 | Calcium chloride (7.5%) | Stiff gel - no flow | Unfilterable |

Other examples are as follows:

TABLE 4

Examples 21-23

| | Example 21 | | Example 22 | | Example 23 | |
|---|---|---|---|---|---|---|
| | w/w | wt (g) | w/w | wt (g) | w/w | wt (g) |
| Polyvinyl Alcohol (87-89 Hydrolyzed), high MW, fine PS | 58.0% | 1160 | 40.0% | 800 | 75.0% | 1500 |
| Carageenan | 28.0% | 560 | 46.0% | 920 | 10.0% | 200 |
| Sodium Alginate |  |  |  |  |  |  |
| Boric Acid | 6.5% | 130 | 5.0% | 100 | 9.0% | 180 |
| Sodium Borate |  |  |  |  |  |  |
| Calcium Carbonate | 6.5% | 130 | 8.0% | 160 | 5.0% | 100 |
| Calcium Chloride |  |  |  |  |  |  |
| Calcium Sulfate w/ Tetrasodium Pyrophosphate (1:1) |  |  |  |  |  |  |
| Potassium Carbonate |  |  |  |  |  |  |
| Potassium Chloride |  |  |  |  |  |  |
| Potassium Phosphate |  |  |  |  |  |  |
| Fumed Silica[1] | 0.50% | 10 | 0.50% | 10 | 0.50% | 10 |
| FD&C Red #2[1] | 0.50% | 10 | 0.50% | 10 | 0.50% | 10 |
|  | 100% | 2000 | 100% | 2000 | 100% | 2000 |

TABLE 5

Examples 24-26

| | Example 24 | | Example 25 | | Example 26 | |
|---|---|---|---|---|---|---|
| | w/w | wt (g) | w/w | wt (g) | w/w | wt (g) |
| Polyvinyl Alcohol (87-89 Hydrolyzed), low MW, fine PS | 58.0% | 1160 | 40.0% | 800 | 75.0% | 1500 |
| Carageenan | 28.0% | 560 | 46.0% | 920 | 10.0% | 200 |
| Sodium Alginate |  |  |  |  |  |  |
| Boric Acid | 6.5% | 130 | 5.0% | 100 | 9.0% | 180 |
| Sodium Borate |  |  |  |  |  |  |
| Calcium Carbonate | 6.5% | 130 | 8.0% | 160 | 5.0% | 100 |
| Calcium Chloride |  |  |  |  |  |  |
| Calcium Sulfate w/ Tetrasodium Pyrophosphate (1:1) |  |  |  |  |  |  |
| Potassium Carbonate |  |  |  |  |  |  |
| Potassium Chloride |  |  |  |  |  |  |
| Potassium Phosphate |  |  |  |  |  |  |
| Fumed Silica[1] | 0.50% | 10 | 0.50% | 10 | 0.50% | 10 |
| FD&C Red #2[1] | 0.50% | 10 | 0.50% | 10 | 0.50% | 10 |
|  | 100% | 2000 | 100% | 2000 | 100% | 2000 |

TABLE 6

Examples 27-29

| | Example 27 | | Example 28 | | Example 29 | |
|---|---|---|---|---|---|---|
| | w/w | wt (g) | w/w | wt (g) | w/w | Wt (g) |
| Polyvinyl Alcohol (98-99 Hydrolyzed), high MW | 58.0% | 1160 | 40.0% | 800 | 75.0% | 1500 |
| Carageenan | 28.0% | 560 | 46.0% | 920 | 10.0% | 200 |
| Sodium Alginate |  |  |  |  |  |  |
| Boric Acid | 6.5% | 130 | 5.0% | 100 | 9.0% | 180 |
| Sodium Borate |  |  |  |  |  |  |

TABLE 6-continued

Examples 27-29

|  | Example 27 | | Example 28 | | Example 29 | |
| --- | --- | --- | --- | --- | --- | --- |
|  | w/w | wt (g) | w/w | wt (g) | w/w | Wt (g) |
| Calcium Carbonate | 6.5% | 130 | 8.0% | 160 | 5.0% | 100 |
| Calcium Chloride |  |  |  |  |  |  |
| Calcium Sulfate w/ Tetrasodium Pyrophosphate (1:1) |  |  |  |  |  |  |
| Potassium Carbonate |  |  |  |  |  |  |
| Potassium Chloride |  |  |  |  |  |  |
| Potassium Phosphate |  |  |  |  |  |  |
| Fumed Silica[1] | 0.50% | 10 | 0.50% | 10 | 0.50% | 10 |
| FD&C Red #2[1] | 0.50% | 10 | 0.50% | 10 | 0.50% | 10 |
|  | 100% | 2000 | 100% | 2000 | 100% | 2000 |

TABLE 7

Examples 30-32

|  | Example 30 | | Example 31 | | Example 32 | |
| --- | --- | --- | --- | --- | --- | --- |
|  | w/w | wt (g) | w/w | wt (g) | w/w | Wt (g) |
| Polyvinyl Alcohol (98-99 Hydrolyzed), low MW | 58.0% | 1160 | 40.0% | 800 | 75.0% | 1500 |
| Carageenan | 28.0% | 560 | 46.0% | 920 | 10.0% | 200 |
| Sodium Alginate |  |  |  |  |  |  |
| Boric Acid | 6.5% | 130 | 5.0% | 100 | 9.0% | 180 |
| Sodium Borate |  |  |  |  |  |  |
| Calcium Carbonate | 6.5% | 130 | 8.0% | 160 | 5.0% | 100 |
| Calcium Chloride |  |  |  |  |  |  |
| Calcium Sulfate w/ Tetrasodium Pyrophosphate (1:1) |  |  |  |  |  |  |
| Potassium Carbonate |  |  |  |  |  |  |
| Potassium Chloride |  |  |  |  |  |  |
| Potassium Phosphate |  |  |  |  |  |  |
| Fumed Silica[1] | 0.50% | 10 | 0.50% | 10 | 0.50% | 10 |
| FD&C Red #2[1] | 0.50% | 10 | 0.50% | 10 | 0.50% | 10 |
|  | 100% | 2000 | 100% | 2000 | 100% | 2000 |

General Use of the Disposal Composition by the Patient

The quantities and duration of treatment are selected at random for this example and by no means indicates any limit on this invention.

In general, the sachet is filled with an appropriate amount of disposal composition material to form a solid mass in a prescription vial or other suitable container with the addition of water. Larger or smaller containers would need to have the amount of the disposal composition material adjusted accordingly.

As for the disposal composition action, subsequent gelling and massing occurs in the product container while in the household waste. Within 30 minutes to one hour, the remaining drug product is dispersed and the mass has solidified.

While specific embodiments of the subject invention have been discussed, the above specification is illustrative and not restrictive. One skilled in the art will appreciate that numerous changes and modifications can be made to the invention, and that such changes and modifications can be made without departing from the spirit and scope of the invention. The full scope of the invention should be determined by reference to the claims, along with their full scope of equivalents, and the specification, along with such variations.

NOTES

1. T. Catan & E. Perez, *A Pain-Drug Champion Has Second Thoughts*, The Wall Street Journal (Dec. 17, 2012, 11:36 AM ET), http://online.wsj.com/article/SB10001424127887324478304578173342657044604.html.
2. See S Shah, *As Pharmaceutical Use Soars, Drugs Taint Water and Wildlife*, Yale Environment 360 (Apr. 15, 2010), http://e360.yale.edu/feature/as_pharmaceutical_use_soars_drugs_taint_water_and_wildlife/2263/
3. C G Daughton, *Drugs and the Environment: Stewardship & Sustainability*, National Exposure Research Laboratory, Environmental Sciences Division, US EPA, Las Vegas, Nev., Report NERL-LV-ESD 10/081, EPA/600/R-10/106 (Sep. 12, 2010), http://www.epa.gov/nerlesd1/bios/daughton/APM200-2010.pdf
4. See U.S. patent application Ser. No. 10/457,562, Publication No. 2004/0033255 and (published Feb. 19, 2004); see also U.S. patent application Ser. No. 12/412,144, Publication No. 2009/0180936 (published Jul. 16, 2009)
5. See U.S. Pat. No. 3,773,955 (issued Nov. 20, 1973); see also U.S. Pat. No. 3,966,940 (issued Jun. 29, 1976)
6 See U.S. Pat. No. 6,696,088 (issued Feb. 24, 2004)
7 See U.S. Pat. No. 7,332,182 (issued Feb. 19, 2008)
8. See U.S. Patent Application No. 20140183070A1
9. See U.S. Patent Application No. 20140187842A1

What is claimed is:

1. A method for sequestering or disposing of a medicament in a solidifying gel or solid comprising:
   combining a medicament, a hydrophilic solvent, and a disposal composition, wherein the disposal composition comprises:
      a carrageenan, an alginate, a polyvinyl alcohol, a chitosan, or a combination thereof; and
      a solvent-activated calcium cross-linking agent, a solvent-activated potassium cross-linking agent, or a combination thereof;
   mixing the hydrophilic solvent, the medicament and the disposal composition; and
   forming a solidifying gel or solid within one hour after mixing, wherein the solidifying gel or solid forms by the hydrophilic solvent activating the solvent-activated calcium cross-linking agent, the solvent-activated potassium cross-linking agent, or the combination thereof in the disposal composition to cross-link at least one of the carrageenan, the alginate, the polyvinyl alcohol, or the chitosan to form the solidifying gel or solid.

2. The method of claim 1, wherein the solidifying gel or solid forms within ten minutes after mixing.

3. The method of claim 1, wherein the solvent dissolves the medicament.

4. The method of claim 1, wherein the disposal composition comprises carrageenan, polyvinyl alcohol, and a solvent-activated calcium cross-linking agent.

5. The method of claim 1, wherein the solidifying gel or solid forms by the hydrophilic solvent activating the solvent-activated calcium cross-linking agent, the solvent-activated potassium cross-linking agent, or the combination thereof in the disposal composition to cross-link at least one of the carrageenan or the alginate to form the solidifying gel or solid.

6. The method of claim 1, wherein the solvent-activated calcium cross-linking agent or the solvent-activated potassium cross-linking agent comprises a carbonate, a gluconate, a chloride, or a combination thereof.

7. The method of claim 1, wherein the disposal composition further comprises a massing agent.

8. The method of claim 1, wherein the disposal composition further comprises a calcium sequestrant.

9. The method of claim 8, wherein the calcium sequestrant comprises a phosphate, a citrate, or a combination thereof.

10. The method of claim 1, wherein the disposal composition further comprises hydrochloric acid, boric acid, adipic acid, ammonium hydroxide, acetic acid, citric acid, lactic acid, ammonium carbonate, sodium bicarbonate, sodium bisulfate, sodium carbonate, sodium hydroxide, trolamine, potassium hydroxide, magnesium hydroxide, glutamate buffer, phosphate buffer, or a combination thereof.

11. The method of claim 1, wherein the disposal composition further comprises an inverse agonist, an antagonist, or a combination thereof.

12. The method of claim 11, wherein the inverse agonist comprises an opioid inverse agonist.

13. The method of claim 11, wherein the antagonist comprises an opioid antagonist.

14. The method of claim 1, wherein the disposal composition consists of components that are generally recognized as safe (GRAS).

15. The method of claim 1, wherein the disposal composition is in the form of a powder, a pellet, a bead, a beadlet, a granule, or a combination thereof.

16. The method of claim 1, wherein the solvent comprises a fruit juice, a vegetable juice, water, milk, alcohol, vinegar, bleach, or a combination thereof.

17. The method of claim 1, wherein the medicament comprises a prescription drug, an over-the-counter drug, a controlled substance, a vitamin, a nutritional supplement, a plant-derived product, a fermented supplement, or a combination thereof.

18. The method of claim 1, wherein the solvent activates the calcium cross-linking agent in the disposal composition to cross-link the carrageenan to form the solidifying gel or solid.

* * * * *